Figure 1:
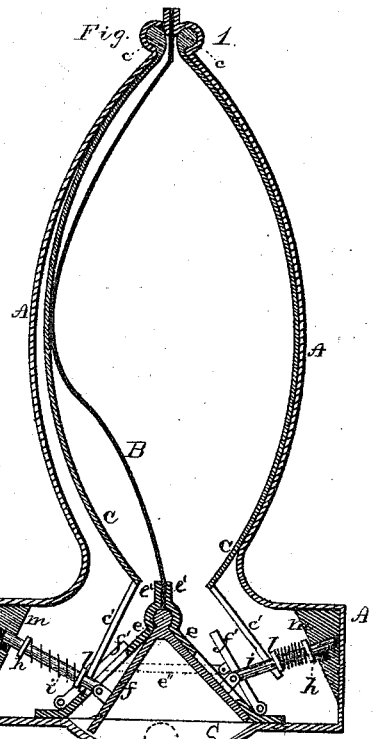

J. J. GREENOUGH.
Meters for Measuring Liquids, Gases, &c.

No. 142,336. 2 Sheets--Sheet 1. Patented September 2, 1873.

WITNESSES.
INVENTOR.

J. J. GREENOUGH.
Meters for Measuring Liquids, Gases, &c.

No. 142,336. Patented September 2, 1873.

UNITED STATES PATENT OFFICE.

JOHN J. GREENOUGH, OF SYRACUSE, NEW YORK.

IMPROVEMENT IN METERS FOR MEASURING LIQUIDS, GASES, &c.

Specification forming part of Letters Patent No. 142,336, dated September 2, 1873; application filed June 13, 1873.

*To all whom it may concern:*

Be it known that I, J. J. GREENOUGH, now residing in Syracuse, Onondaga county, New York, have invented certain Improvements in Meters for Measuring Liquids, Gases, &c., of which the following is a specification:

The meters to which my improvements are particularly applicable are the well known diaphragm-meters, although they may in part be applicable to other classes of meters.

The purpose of my present invention is to simplify and cheapen the construction of the meter, render the parts more direct and certain in their action, self-adjusting, and perfect in working, with less liability to derangement than the meters heretofore essayed.

The construction is as follows: I form a shell, A, in shape an oblate spheroid, or such other figure as may be found best adapted to the purpose. This shell is divided into two parts in the plane of its longest diameter, which parts have outward-projecting flanges around their edges, which are bolted together with a diaphragm, B, of any suitable flexible material, impervious to the material to be measured, between them, and tightly held all around its edge, the diaphragm being of a form to comport with the interior of the half-shell. Within each of the half-shells A there is an old and well-known perforated concave disk, C, for the diaphragm B to press against to cause the valves to act. So far my meter is like others that have before been essayed. The disks C in my meter are hinged at their upper edge to the shell, as seen at $c$, Fig. 1, of the drawing. From its lower edge an arm, $c'$, projects downward to connect with the valve-gearing, or, if preferred, the disk may be jointed at the center to an arm of a lever of the first or second order. Below the movable part of the diaphragm I place within the body of the shell certain partitions forming the valve-seats, and opening directly into the body of the meter, which constitutes one of the most important of the distinguishing features of my invention.

Figure 2:
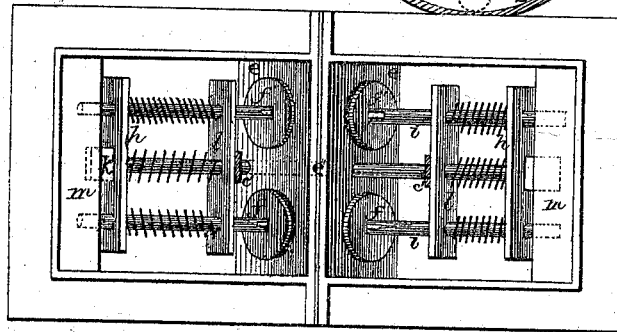

One form of valve is shown in Fig. 1, which is a vertical cross-section; Fig. 2, a plan. $e\ e$ are two inclined planes cast in one piece with or affixed with tight joints to the halves of the shell A, and holding the lower edge of the diaphragm B between the flanges $e'\ e'$ on their upper edges, thus completely dividing the shell into two parts by the diaphragm, with a communication through the valve-ports, of which there are four, two in each of the valve-seat plates $e\ e$, as clearly seen in Fig. 2. The space between the plates $e\ e$ is divided into two by a cross-partition, $e''$, between the ports, so that a communication is made between the two chambers of the shell and each space on either side of partition $e''$. In one of these spaces there is a double valve, $f$, or two valves linked together so as to move simultaneously, hinged at the apex of the chamber so that when one of them closes its port the other is open, and by vibrating them from side to side, the ports are alternately opened and closed. Two other valves, $f'\ f'$, are hinged to the outside of the plates $e\ e$, and cover the ports opening into the other chamber. These valves $f'\ f'$ are linked together by a link, $f''$, passing through the ports from one valve to the other, which so unites them as to have one valve open while the other is closed. The two valves $f$ and $f'$ are united together by a yoke, $h$, on each side, connected with the valve-stems $i$, on each of which there may be a coiled wire, or any other efficient spring, and between the yoke $h$ and the valve there is a slide, $l$, for compressing said spring. Between the two valve-stems there is a catch, $k$, loosely jointed to the yoke $h$, which catches upon the abutment $m$ and holds the valves in position when the yoke is drawn away from the abutment $m$ until the springs on that side are compressed, when it is tripped and allows the compressed springs to throw the valve. The catch is tripped by the slide $l$ striking the catch-rod.

The action is as follows: When the valves are thrown to the left the left chamber of the meter is filled through the inlet-port, the outlet-port being closed. This action forces the diaphragm to the right against the right-hand disk, the arm $c$ of which, acting on slide $l$, compresses the right-hand springs. Just as the chamber is filled the said arm reaches its extreme position to the right, the catch is tripped, and the valves are thrown to the right, opening the right-hand inlet-port and the left-hand outlet-port, reversing the other two and bringing the left-hand catch into action, when the right-hand chamber is filled and the left-hand chamber discharged, until the arm $e'$ on the left-hand disk is similarly acted on with like result, throwing all the valves to the left and bringing the right-hand catch into action. This continues so long as there is any flow through the meter.

Figure 3:
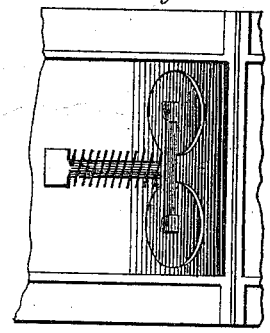
Figure 4:
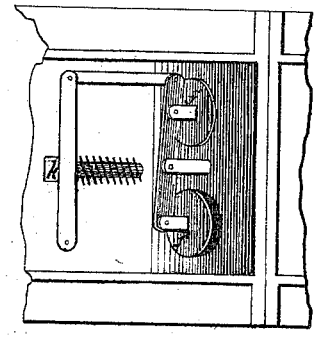

It is obvious that the mechanism for moving the valves with regular pulsations, as the chambers each side of the diaphragm are filled, may be variously modified. For instance, using but one spring in each chamber attached to the catch $k$, to throw both valves, (see Fig. 3,) the valve-stems may be connected by a lever, $n$, (see Fig. 4;) in this case the valves must be all on the same side of the valve-seat plates. It is also obvious that a lever may be connected with the arm $c'$ of the disk, so as to reverse the action of the springs and valves. The details of such an arrangement are too palpable to need description. These are mere mechanical changes that might be still further varied. Instead of the springs, weights may be substituted for throwing the valves.

Figure 5:
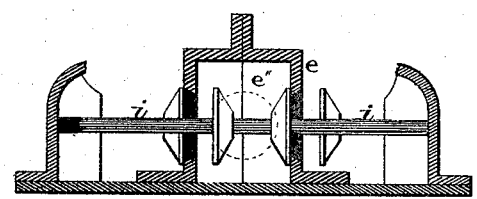
Figure 6:
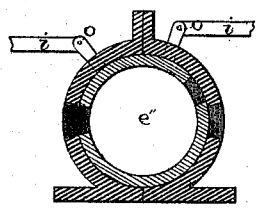
Figure 7:
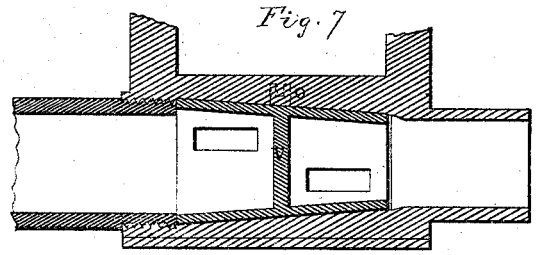

I propose to substitute for the valves above described puppet-valves, placing the induction-valves on one stem and the eduction-valves on another stem parallel therewith, making the ports upright instead of inclined, as before described, (see Fig. 5.) These valves are actuated as those above described. Another form of valve is represented in Fig. 6. This is a revolving or faucet valve. The chamber in this case is cylindrical, or tapered, reamed out perfectly true, or lined with hard rubber or other suitable material to fit the valve with a tight joint. In this I fit the round valve, (see section, Fig. 7.) This valve is hollow, with a partition, $v$, across its center, between the induction and eduction ports in its sides, and receives the flow into one end, which, after passing through the meter, is discharged at the other. This valve is turned by arms $o\ o$ projecting into the measuring-chambers and connected with the arms $c'$, as in the above-described devices. Straight sliding valves may be in like manner operated.

It needs only to be mentioned that the position of the measuring-chambers and valves relatively can be reversed—the valves above and the chambers below—without changing the character of the improvements.

The water-ways may open straight through the sides of the shell at the ends of the valve-seats $e\ e$, or go down into the base S.

Some of the advantages of this meter over any other are as follows: Placing the entire valve-shifting apparatus within the measuring-chambers, by which greater simplicity of construction and directness of action are attained, and the single diaphragm answers to form the entire division and water-tight joint between the moving and stationary parts, by which the expense of packed and other water-tight joints is avoided. By placing the induction-ports beside the eduction-ports, instead of on a line with them, less accuracy is required in the fitting and movement of them, as any differences or inequality in their movements are regulated by the independent action of the valve stems or connections, and a more direct and free water-way to and from the measuring-chambers is attained than has heretofore been done.

I make no claim to a diaphragm-meter, as that is an old and well-known device; or to hinged, puppet, or slide valves, for I am aware that these are not new; but

I claim as my invention—

1. The valve-shifting apparatus constructed and arranged substantially as herein specified, and for the purposes set forth.

2. The valve-shifting apparatus within the two separate measuring-chambers, when connected through the valve-ports, as herein set forth.

3. The induction and eduction passages and valve-seats, when constructed and arranged parallel with each other, as herein specified, so as to admit of the independent action of the inlet and outlet valves, as and for the purposes herein described.

JOHN JAMES GREENOUGH.

Witnesses:
E. GREENOUGH,
F. H. WILLIAMS.